United States Patent [19]
Jordan et al.

[11] 3,959,884
[45] June 1, 1976

[54] METHOD OF CLASSIFYING FINGERPRINTS

[75] Inventors: Gene M. Jordan; Robert G. Eisenhardt; Dean Z. Douthat, all of Ann Arbor, Mich.

[73] Assignee: First Ann Arbor Corporation, Ann Arbor, Mich.

[22] Filed: July 25, 1975

[21] Appl. No.: 599,143

[52] U.S. Cl. .................................. 33/1 BB; 283/7; 340/146.3 E
[51] Int. Cl.² ........................................... G06K 9/00
[58] Field of Search .................... 33/1 R, 1 BB, 1 S; 340/146.3 E; 283/7

[56] References Cited
UNITED STATES PATENTS

| | | | |
|---|---|---|---|
| 3,292,149 | 12/1966 | Bourne | 340/146.3 E X |
| 3,419,287 | 12/1968 | Rudie | 340/146.3 E |
| 3,558,864 | 1/1971 | French | 340/146.3 E X |
| 3,560,928 | 2/1971 | Berger et al. | 340/146.3 E |
| 3,611,290 | 10/1971 | Luisi | 340/146.3 E |
| 3,893,080 | 7/1975 | Ho | 340/146.3 E |

FOREIGN PATENTS OR APPLICATIONS

| | | | |
|---|---|---|---|
| 1,186,169 | 4/1970 | United Kingdom | 283/7 |

*Primary Examiner*—William D. Martin, Jr.
*Attorney, Agent, or Firm*—Reising, Ethington, Barnard

[57] ABSTRACT

A method for identifying fingerprints is disclosed; the method produces a descriptor code which is uniquely related to a given fingerprint impression. A fingerprint pattern is transformed into an informational model which represents the relative location of all data points with respect to selected groups of other data points. The method comprises the steps of transforming the fingerprint impression into a representation of a three-dimensional surface wherein the Z-axis coordinate has a value dependent upon the frequency of occurrence of ridge lines at a specific set of X-axis and Y-axis coordinates when the origin is taken at multiple positions over a prescribed part of the fingerprint impression, determining the values of local spatial derivatives, such as the surface curvature of a plurality of different areas of the three-dimensional surface, and concatenating the values in a predetermined order to construct a descriptor code for the fingerprint.

17 Claims, 21 Drawing Figures

| COLUMN ROW | 0 | 1 | 2 | 3 | 4 | 5 | 6 | 7 | 8 | 9 | 10 |
|---|---|---|---|---|---|---|---|---|---|---|---|
| 19 | | 0 | 18302 | 18456 | 19054 | 19903 | 20694 | 21124 | 21021 | 20468 | 19620 | 18829 |
| 20 | | 0 | 18231 | 18476 | 19189 | 20121 | 20937 | 21336 | 21207 | 20571 | 19697 | 18893 |
| 21 | | 0 | 18257 | 18604 | 19410 | 20288 | 21034 | 21297 | 21111 | 20481 | 19684 | 18957 |
| 22 | | 0 | 18533 | 18957 | 19684 | 20430 | 20937 | 21021 | 20796 | 20243 | 19600 | 19041 |
| 23 | | 0 | 19176 | 19613 | 20082 | 20500 | 20693 | 20590 | 20333 | 19960 | 19510 | 19118 |
| 24 | | 0 | 20166 | 20462 | 20552 | 20513 | 20346 | 20102 | 19864 | 19665 | 19420 | 19227 |
| 25 | | 0 | 21407 | 21426 | 20976 | 20333 | 19832 | 19485 | 19362 | 19369 | 19362 | 19388 |
| 26 | | 0 | 22885 | 22416 | 21252 | 20044 | 19215 | 18893 | 18912 | 19105 | 19369 | 19587 |
| 27 | | 0 | 24525 | 23168 | 21259 | 19594 | 18675 | 18417 | 18585 | 18964 | 19465 | 19845 |
| 28 | | 0 | 25958 | 23387 | 20918 | 19189 | 18282 | 18109 | 18392 | 18970 | 19671 | 20160 |
| 29 | | 27752 | 26157 | 22840 | 20365 | 18777 | 18064 | 17980 | 18379 | 19137 | 19960 | 20475 |
| 30 | | 26929 | 24608 | 21831 | 19767 | 18482 | 17929 | 17980 | 18578 | 19465 | 20327 | 20725 |
| 31 | | 24428 | 22860 | 20802 | 19260 | 18308 | 17916 | 18147 | 18932 | 19928 | 20725 | 20918 |
| 32 | | 22493 | 21368 | 19960 | 18919 | 18270 | 18115 | 18540 | 19491 | 20494 | 21060 | 20970 |
| 33 | | 20963 | 20211 | 19395 | 18732 | 18360 | 18495 | 19150 | 20172 | 20976 | 21201 | 20796 |
| 34 | | 19793 | 19401 | 19060 | 18713 | 18675 | 19086 | 19890 | 20777 | 21252 | 21079 | 20475 |
| 35 | | 18945 | 18919 | 18932 | 18964 | 19215 | 19787 | 20565 | 21156 | 21195 | 20719 | 20012 |
| 36 | | 18475 | 18752 | 19112 | 19472 | 19883 | 20455 | 21008 | 21182 | 20841 | 20160 | 19459 |
| 37 | | 18379 | 18719 | 19433 | 19954 | 20410 | 20835 | 21111 | 20886 | 20243 | 19504 | 18919 |
| 38 | | 18475 | 19035 | 19697 | 20295 | 20719 | 20976 | 20925 | 20391 | 19575 | 18880 | 18437 |
| 39 | | 18636 | 19215 | 19883 | 20526 | 20892 | 20880 | 20526 | 19774 | 18887 | 18302 | 18057 |

FIG. 9

3 1 1 2 3 4 1 . . . . . . . 3
FIG. 14
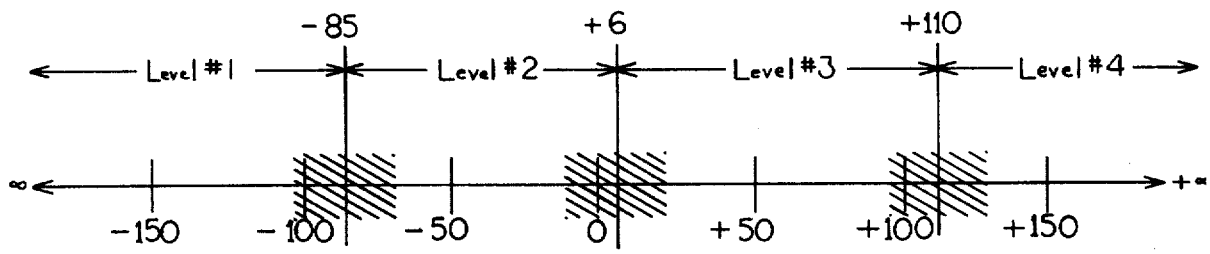
FIG. 15
1(0) 3(-) 4(-) 2(0) . . . . . 3(0)
FIG. 16
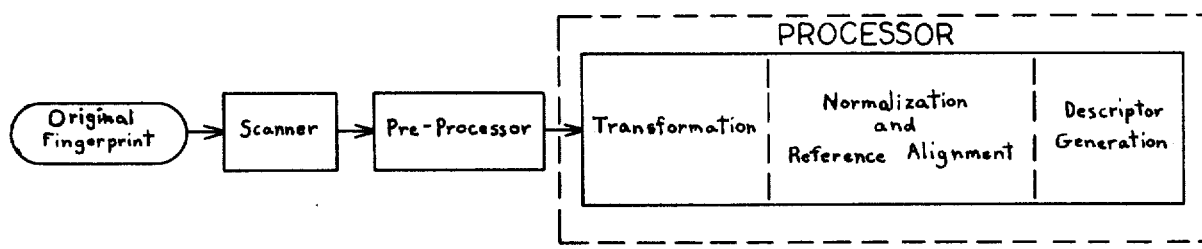
FIG. 17
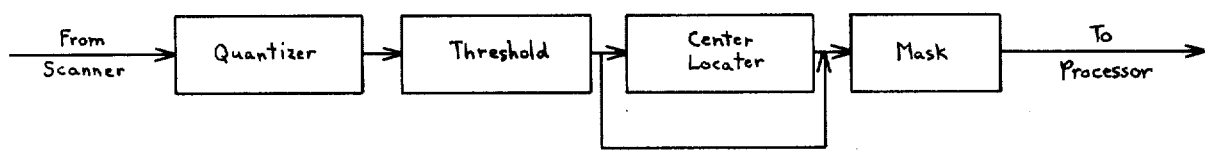
FIG. 18

METHOD OF CLASSIFYING FINGERPRINTS

FIELD OF THE INVENTION

This invention relates to a method of identifying fingerprints.

BACKGROUND OF THE INVENTION

The use of fingerprints for the identification of individual persons is of great importance in law enforcement and may become important in commercial transactions, such as credit card usage and the like. The use of fingerprints for identification of one individual out of a large number of people depends upon a description which enables speedy and reliable identification. The identification process generally involves matching an "inquiry copy" of a fingerprint set with a "file copy" of a fingerprint set by means of comparison of the respective classifier codes.

A fingerprint impression has several characteristics which have heretofore been used in classification systems. One of the principal characteristics is the fingerprint pattern which, in all cases, has an upper portion of concentric quasicircular ridges and a lower portion of a distinctive ridge format or pattern type. Many common pattern types have been given well known classical names such as plain whorl, plain loop, tented arch, etc. Another important characteristic which has been used for identification is the fine ridge structure of the fingerprint. The ridges include detailed features such as terminations or bifurcations of the ridge, called minutiae. These minutiea have been used as key features for purposes of visual identification.

In practice, fingerprint identification has been based upon the combination of pattern type, ridge information, and minutiae data. The well known Henry system is the predominant manual system used by law enforcement agencies and utilizes a code consisting of the pattern type for each of the ten fingers plus ridge count from certain fingers. In the Henry system a relatively small number of classifying characteristics are used and hence the total number of identifier codes that can be constrcted is too small to uniquely account for the millions of fingerprints in a comprehensive file. Consequently, a large number of file copies, as many as one thousand and more, each containing different sets of fingerprints must be filed under the same code number. This requires a large number of file copies to be searched manually in order to obtain an identification.

In recent years, various investigators have proposed mechanized classification systems for fingerprints to speed up the identification process. Some of these systems involve optical scanning of the fingerprint impression to produce electrical signals representative of the particular fingerprint and storing the data in an electronic memory for programmed retrieval and comparison. Such systems typically depend upon acquiring and storing information regarding the pattern type and the minutiae as the key elements for identification purposes.

BRIEF SUMMARY OF THE INVENTION

This invention provides a system for identifying fingerprints which enables the construction of a descriptor code independently of human judgment. Further, according to the invention a fingerprint may be identified by a descriptor code having a large number of distinctive code elements so that only one fingerprint, or at most a few fingerprints, would have the same code. The method of identification may be performed manually; however, the method may also be performed with the aid of high speed data acquisition and processing apparatus; in either case the resulting descriptor code is of a type adapted for computer controlled searching and comparison of fingerprint files for identification purposes.

The invention comprises a method of identification wherein a fingerprint pattern, as represented by a planar impression, is transformed into an informational model which uniquely represents a given fingerprint. The model represents the relative location of all data points with respect to all other data points. The model has attributes which, in fact, represent the features of the fingerprint pattern and which can be defined in quantitative terms. This transformation preferably comprises transforming the two-dimensional representation of the fingerprint impression into the representation of a three-dimensional surface. With a three-dimensional surface representation of the fingerprint pattern, characteristics of the surface may be used to define the particular fingerprint. The preferred embodiment includes such a tranformation wherein the three-dimensional surface has a predetermined set of first and second coordinates and a variable third coordinate for each set, the third coordinate having a value dependent upon the frequency of occurrence of ridge lines at a specific set of first and second coordinates when the origin thereof is taken at a multiplicity of different positions within a prescribed part of the fingerprint impression. Further, the surface characteristic is a local spatial derivative, preferably the curvature of a number of different areas of the three-dimensional surface. A descriptor code is then constructed by concatenating the values of curvature in a predetermined order.

A preferred and specific embodiment of the invention comprises the steps of converting a fingerprint pattern to a pattern of binary values which define the spatial array of ridges and valleys and selecting a part of the pattern for transformation by a repeatable criteria, such as a circular area hving its center at the average center of curvature of the circular ridge lines of the upper part of the print. The data represented by the selected part is transformed into a plot of a relative position/intensity surface with a predetermined set of first and second coordinates and a variable third coordinate having a value dependent upon the frequency of occurrence of ridge lines when the origin of the first and second coordinates is taken at multiple positions over the selected area. A main coordinate reference system is established on the relative position/intensity surface with an orientation inherently definable for any fingerprint. The surface is divided into multiple areas, the number of areas being equal to the desired number of code elements in the descriptor code to be constructed. The curvature of the surface within each area is determined and preferably quantized to produce the number of code elements. Finally, a descriptor code is constructed by concatenating the code elements in a predetermined order.

DETAILED DESCRIPTION OF THE INVENTION

A more complete understanding of the invention may be obtained from the detailed description that follows taken with the accompanying drawings in which:

FIG. 9 represents a relative position/intensity surface in the manner of a contour map;

FIG. 14 illustrates a typical descriptor code for a fingerprint;

Figure 19:
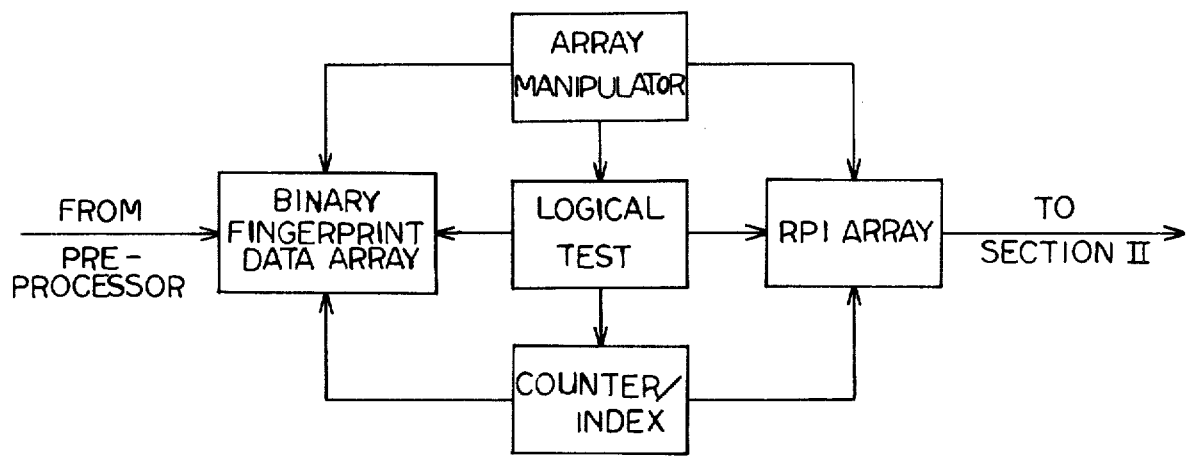
Figure 20:
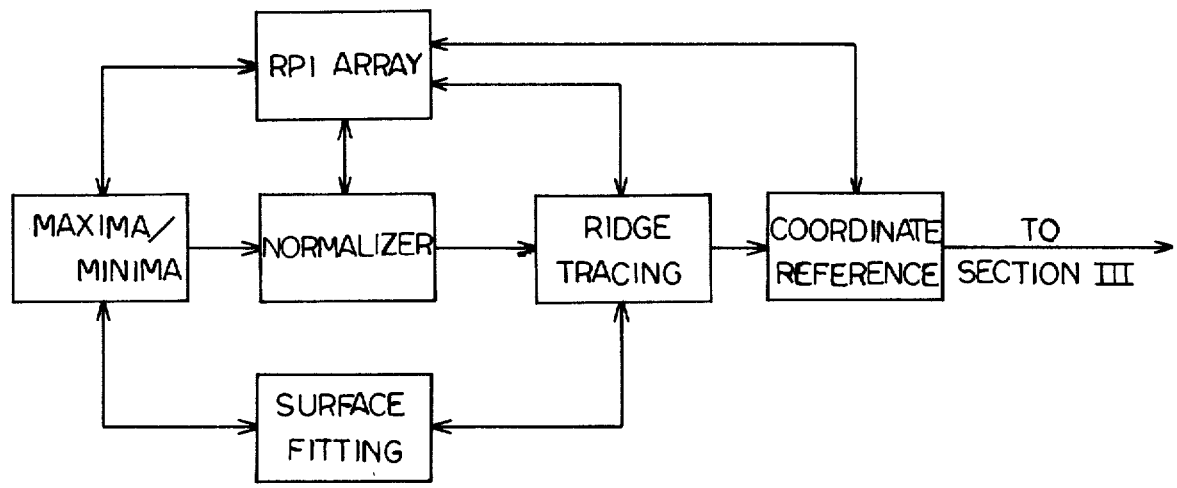
Figure 21:
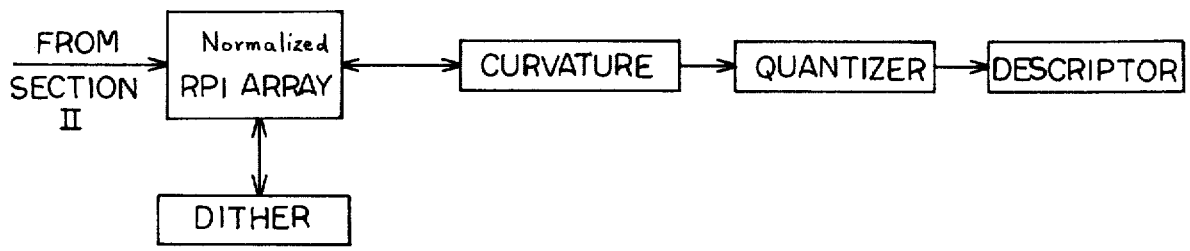

FIG. 15 graphically represents statistical criteria for use in determining search indicators for each digit of the descriptor code;

FIG. 16 represents a descriptor code modified with search indicators;

FIG. 17 is a block diagram of apparatus which may be used to perform the method of this invention;

FIG. 18 is a functional block diagram of the preprocessor;

FIG. 19 is a functional block diagram of a transformation section;

FIG. 20 is a functional block diagram of a normalization and reference alignment section, and FIG. 21 is a functional block diagram of a descriptor generation section.

The invention will now be described with reference to a specific embodiment and with the aid of the aforementioned drawings. It will be understood as the description proceeds, that the inventive method can be performed by well known apparatus. An important aspect of the inventive method is that it can be performed at very high speed with the aid of an optical scanner and digital computer as described below, following the description of the method, per se.

The illustrative embodiment of the inventive method will be described by treating the method steps successively in the order in which they are to be performed.

CONVERSION OF IMPRESSION FROM ANALOG TO BINARY FORM

Figure 1:
FIG. 1 shows a conventional impression of a fingerprint.

A typical fingerprint impression is illustrated in FIG. 1, it may be produced in a conventional manner such as an ink impression or a finger placement against a prism. The impression is made up of different shades of grey ranging from some minimum value to some maximum value with specific values dependent upon the amount of ink or finger pressure, etc. Thus, the initial impression is presented in analog form which requires both image enhancement and data reduction for subsequent processing. For this purpose, the fingerprint impression is converted to a binary representation in which the ridges of the pattern are defined by black regions and the valleys or intervening spaces are defined by white regions. To accomplish this conversion, the fingerprint impression is divided into small cells, suitably squares which are 50 microns on a side, and the image density of each cell is quantized by measuring to obtain a numerical value within a predetermined range. This is preferably accomplished with an optical scanner which produces an analog voltage corresponding to the image density. The scanner should have a spot size resolution of approximately 50 microns. Suitably, the range of numerical values of image density extends from 1 to 32 with 1 representing white and 32 representing black and the intermediate values being scaled proportionately. A threshold value within the range is established and those cells having a measured value less than the threshold are called white and those above the threshold value are called black. The threshold value may be varied in accordance with the variation in the absolute range of the image density levels in the given fingerprint impression. This insures that all impressions, regardless of how light or dark, will be described with some black and some white regions defining the ridge and valley pattern. The variable threshold is determined by measuring the average color density in a large number of cells immediately surrounding the cells to which the quality of black or white is to be ascribed.

Figure 2:
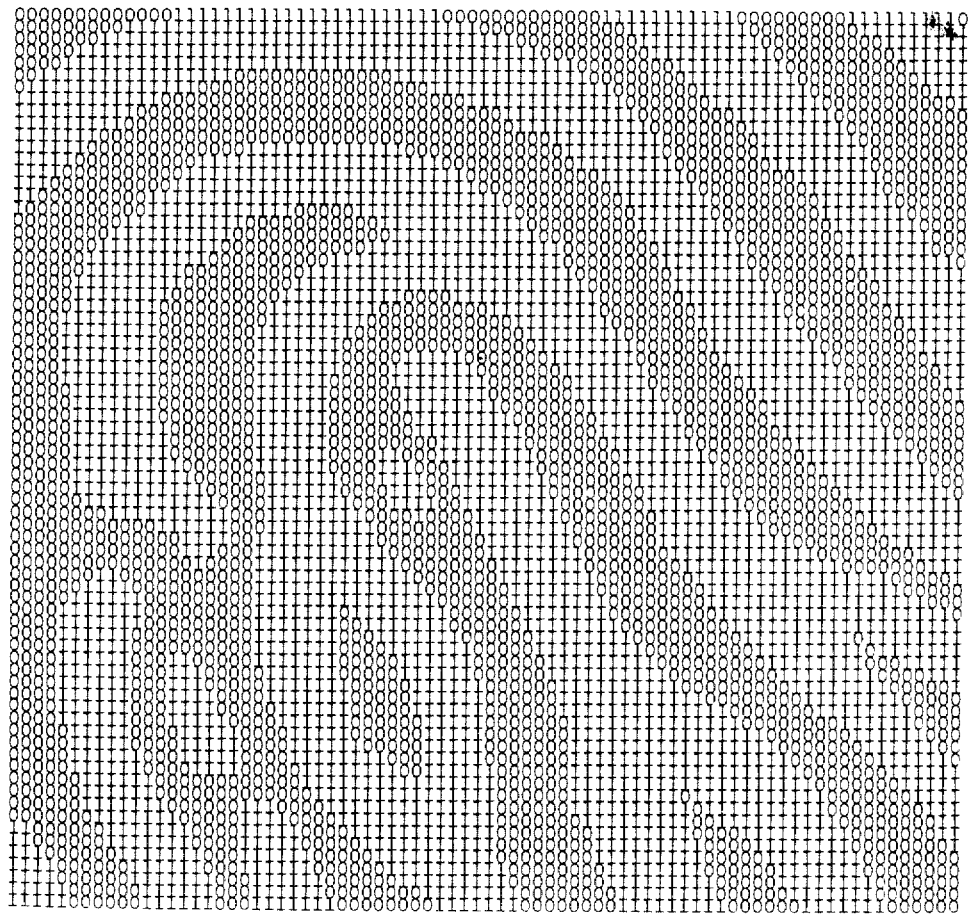
FIG. 2 shows a binary representation of the portion of a fingerprint of FIG. 1 enclosed within the box.

Thus, for each cell of the fingerprint impression, the density is compared with the threshold value determined for that cell and the cell is then called either black or white. From this binary classification of the density of the impression, a binary representation may be constructed as illustrated in FIG. 2 wherein a black cell is represented by a 1 and a white cell is represented by a 0. This binary representation of the fingerprint impression is well adapted for subsequent processing.

LOCATION OF THE FINGERPRINT CENTER

In the identification of the fingerprints it is unnecessary and undesirable to use the entire impression. Instead, it is desirable to use only so much of the impression as is necessary for reliable identification. However, it is imperative for positive identification, that comparable or corresponding parts of the fingerprint impression are selected. For this reason, it is necessary to select a part of the fingerprint impression in accordance with a criteria which is repeatable for all fingerprint impressions. This criteria is based upon the location of a point which is defined as the center of the fingerprint.

The center of the fingerprint, by definition, is a point in a position which is the average value of the center of curvature of the quasi-semicircular ridges in the upper half of the fingerprint impression. In particular, an arbitary coordinate system is established and about 40 points on the ridge structure are examined to determine the coordinates at the center of curvature for each such point. Since the ridges are not true circular segments the coordinates of the center of curvature will be somewhat different for each point examined. The average value of the coordinates of the centers of curvature is preferably taken by using the first and second moments of the values of the individual coordinates. This average value represents the center of the fingerprint.

Figure 3:
FIG. 3 shows a masked binary representation of a fingerprint.
Figure 4:
FIG. 4 shows a selected area of a binary representation of a fingerprint.

The selected area of the fingerprint impression to be used for identification purposes is defined with reference to the center of the fingerprint. Preferably the selected area is a circular area having a predetermined radius of such value that the circular area will be completely filled with the fingerprint pattern by almost all fingerprint impressions, say more than 99 percent. A circular area having a radius of 0.6 centimeters is suitable. The selected area of the fingerprint is uniquely defined by the circular area centered on the center of the fingerprint. All points outside the selected area are eliminated. This step of selection is depicted in FIG. 3 by placement of a mask 16 over the binary representation of the fingerprint. The mask has a circular aperture 18 and is centered on the fingerprint center. The aperture of the mask will reveal approximately 45,240 cells (1's or 0's) for use in identification of the fingerprint. In some cases a fingerprint impression may be of such inferior quality with the mask that it does not warrant further processing.

The selected area of the binary representation of the fingerprint impression, as represented in FIG. 3, is in readiness for subsequent processing. In this state, the binary representation of the selected area is an enhanced image in a spatial plane of the ridge and valley pattern. This two-dimensional representation of the pattern is to be transformed into an informational model in three dimensions for identification purposes.

TRANSFORMING THE SPATIAL PLANE REPRESENTATION TO A RELATIVE POSITION/INTENSITY SURFACE

In order to develop data which uniquely describes a given fingerprint pattern, the spatial plane pattern is transformed into an informational model. The model to be developed will represent the relative location of all data points of a given set with respect to all selected groups of data points of the set within the selected area of the pattern. The data points are locations of the binary digits in the binary fingerprint pattern; specifically, a data point is located at the center of each cell which was established for the analog to binary conversion. The model implies a physical, three-dimensional surface having attributes representing features of the fingerprint pattern and which can be defined in quantitative terms.

The transformation from the spatial plane representation of the pattern to an informational model is accomplished by developing data regarding the distribution of binary digits in the binary fingerprint pattern. In making the transformation, either binary 1's or binary 0's can be taken as a set for determining distribution because the ridges and the valleys are complementary and are represented by 1's and 0's respectively. Since the ridges have already been selected for processing, the distribution of 1's is selected for the transformation. In general, all binary 1's are taken one-by-one as a reference data point and the distribution of all other binary 1's relative to each reference data point is determined; then the distribution patterns for all reference data points are superimposed with the reference data points of each distribution pattern being superimposed. The representation of data point distribution is taken as the summation of all the binary 1's which occur at each data point location in the pattern. Although all binary 1's in the selected area (within the mask) are to be used as reference data points for determining distribution of the other binary 1's, it is not necessary that all other binary 1's in the selected area be considered in the distribution pattern; instead, the number of binary 1's considered in the distribution relative to the reference data point may be limited to those contained within a predetermined radius from the reference data point. In determining the distribution of binary 1's, most of the useful information is contained in the first one or two ridges from the reference data point. Adequate data for effecting the transformation is acquired without going beyond a distance equal to about 2½ ridges from the reference data point. The average ridge to ridge spacing for fingerprints is approximately 0.55 millimeters and thus the range of interest about any reference data point is approximately 1.375 millimeters. Since the data points are coincident with the center of the cells which were established for the analog to binary conversion and the cells are 0.05 millimeters on a side, the range of interest about the reference data point is 28 cells or data points.

The manner of effecting the transformation from the spatial plane representation to the relative position/intensity surface representation will be explained with reference to FIGS. 5 and 6. An overlay transform grid 22 is constructed of transparent material in a semicircular shape with the grid intersections being spaced the same dimensions as the data points. The transform grid is 57 data points in diameter and is adapted to be superimposed upon the binary representation of the fingerprint, a portion of which is shown in FIG. 6. For convenience, the intersections of the transform grid may be identified by establishing the rectangular coordinate system with the origin at the center of the semicircular shape of the grid. For the example dimensions given, the grid will contain 1311 intersections which may be defined by their rectangular coordinates and which correspond to 1311 data points on the binary fingerprint of FIG. 6. The grid is positioned upon the binary fingerprint pattern with the origin of the coordinate system coinciding with a binary 1 at any position on the binary pattern of the selected area, suitably at the uppermost position of the area. The coordinate axes of the grid are maintained in a fixed orientation relative to the columns and rows of data points in the binary pattern, with the X-axis parallel to the rows and the Y-axis parallel to the columns. With the overlay grid in the first position, the distribution of binary 1's relative to the reference data point (which is that point coinciding with the origin of the grid) is recorded by registering a count of 1 for each coordinate position at which a binary 1 occurs. For this purpose of recording the counts registered according to the data point distribution, a tabular record may be constructed, as in FIG. 8, which lists the sets of coordinates of all grid intersections of the overlay grid. The overlay grid is successively disposed with its origin at each binary 1 on the selected area of the fingerprint and for each position, a count of 1 is entered in the table of FIG. 8 for each set of coordinates of the overlay grid at which a binary 1 appears. Since the count for a given set of coordinates will be incremented by 1 for each overlay position in which a binary 1 appears at the set of coordinates, the total count accumulated after all positions have been processed will be recorded in the count column of the table.

Figure 5:
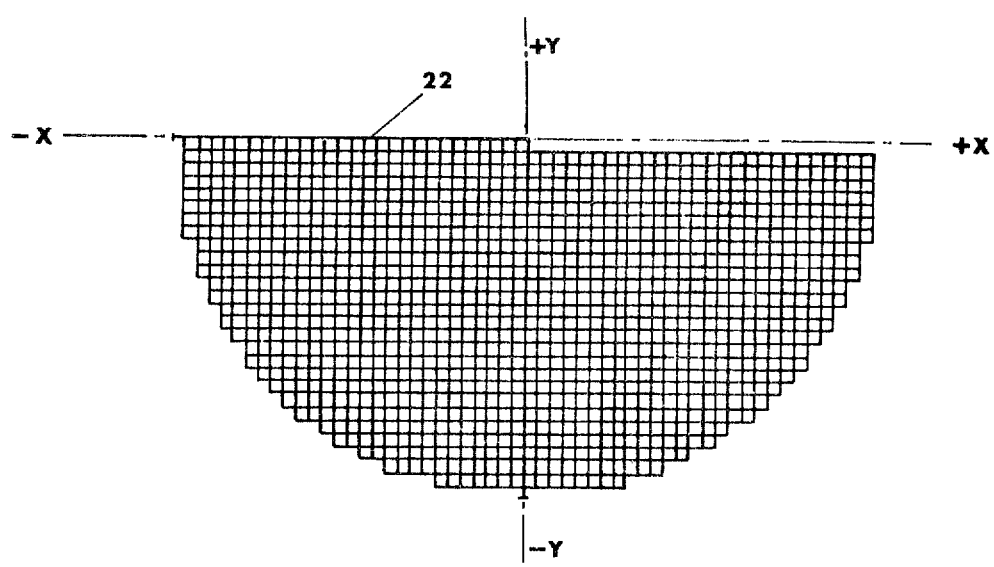
FIG. 5 shows a transform grid for use in constructing a fingerprint transform.
Figure 6:
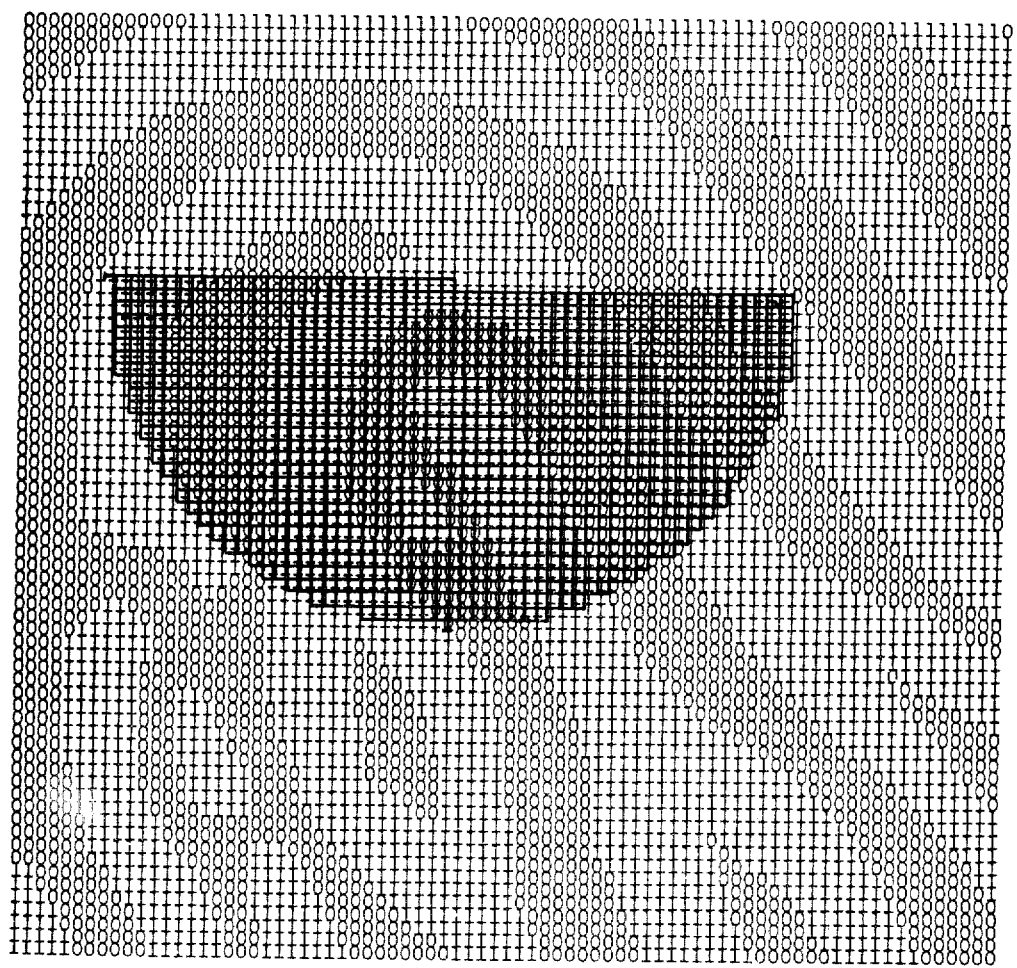
FIG. 6 shows a transform grid superimposed upon a selected part of a binary representation of a fingerprint.
Figures 7, 8:
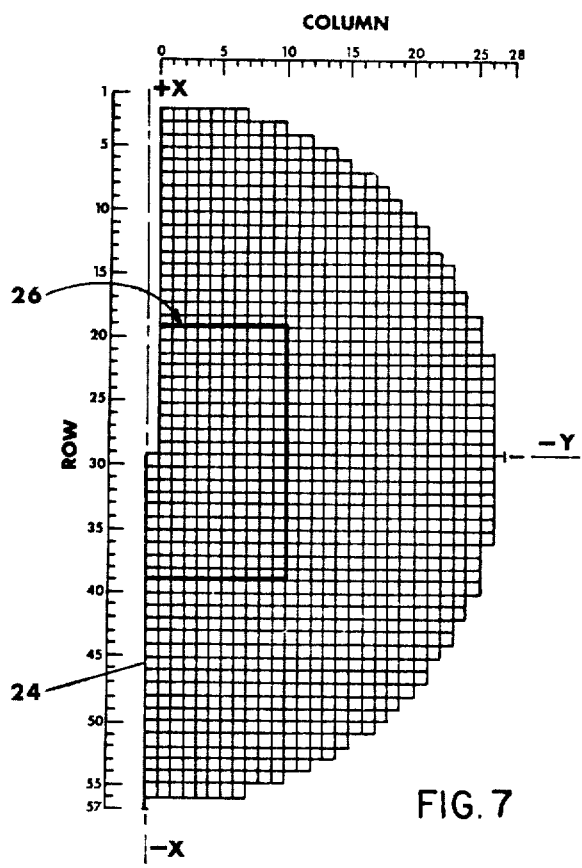
FIG. 7 shows a relative position/intensity surface in two dimensional outline.
FIG. 8 is a table of values representing the relative position and intensity surface.

The relative position/intensity surface is shown in two-dimensional form in FIG. 7 and is, of course, of the same shape as the transform grid 22 of FIG. 5. The column and row number system shown in FIG. 7 is different from the coordinate system established for the grid of FIG. 5 and used for tabulating the count in FIG.

8. The column and row number system will be used to identify areas of the relative position/intensity surface in the discussion that follows. In particular, the area 24 within the bold line 26 will be discussed below with reference to FIGS. 9 and 10.

The table entries of FIG. 8 which represent the relative position/intensity of the fingerprint pattern also imply a physical three-dimensional surface. In particular, the three-dimensional surface has a predetermined set of first and second coordinates corresponding to the X and Y coordinates of FIGS. 5 and 8 and a third coordinate, Z, for each set of X and Y coordinates and which is variable, dependent upon the relative position/intensity of binary 1's relative to each reference data point. The transform represented by the table entries can also be represented by a surface map as shown in FIG. 9. FIG. 9 shows only that portion of the relative position/intensity surface which is within the bold line 26 of FIG. 7 and may be regarded as a contour map with X-axis and Y-axis coordinates, as indicated, defining data points corresponding to the grid intersections of the overlay transform grid. The map coordinate system (as distinguished from the column and row number system) includes a Z-axis which is normal to the plane of the paper and corresponds to the grid coordinate system. The location of any point on the surface is defined by the three coordinates with the Z-axis coordinate being given by the number occurring at the position defined by the X-axis and Y-axis coordinates. The Z-axis coordinate has a value dependent upon the frequency of occurrence of ridge lines at a specific set of X and Y coordinates when the origin is taken at multiple positions in the selected area of the binary fingerprint pattern.

NORMALIZATION OF THE RPI SURFACE

Referring now to FIG. 9, it is noted that the Z-axis coordinates range from a low value of 17,916 to a high value of 27,752. The highest value always occurs at the origin. For identification purposes, the relative values of Z-axis coordinates are of interest, rather than the foregoing absolute values. The absolute values vary among different impressions of the same finger because of noise, i.e. ink levels, blurring, distortion, etc. of the fingerprint. In order to obtain relative values for the Z-axis coordinates the relative position/intensity surface is normalized by setting the lowest point on the surface at a lower reference value, such as 0, and setting the second highest peak on the surface to an upper reference value, such as 10,000. (In the example fingerprint being described the highest Z-axis peak and the lowest point are both contained within the portion of the relative position/intensity surface shown in FIG. 9. The second highest peak on the surface is used rather than the highest peak because the highest peak is not pattern sensitive. A peak is a point that is higher than the closest eight surrounding points.)

In order to normalize the relative position/intensity surface in the manner just mentioned, it is necessary to precisely located the lowest point and the second highest peak on the surface. It is observed that these points are not necessarily the same as the smallest Z-axis coordinate encircled by broken line 37 and the second largest Z-axis coordinate peak encircled by the broken line 39, respectively, which occur on the grid intersection of the relative position/intensity surface; the implied surface is continuous and therefore a peak or a low point might occur at values of X-axis and Y-axis coordinates other than the values corresponding to the grid intersections. The second highest peak on the surface will be in the vicinity of the Z-axis coordinate having the second highest peak value and may be located more precisely by a surface fitting technique. Similarly, the lowest point on the surface may be found.

In the preferred embodiment, the surface is normalized by setting the lowest point or valley at 0 and setting the second highest peak to the value of 10,000. All intermediate values on the relative position/intensity surface are scaled proportionately within these limits; also the values on the non-normalized surface which are higher than the second highest peak are scaled proportionately. The resulting normalized relative position/intensity surface is represented in part in FIG. 10 and corresponds to the same portion of the relative position/intensity surface as FIG. 9. It is noted that the lowest point on the normalized surface has a value of 9 rather than a value of 0, indicating that the lowest point is at a location off the grid intersection. The second highest peak on the normalized surface has a value of 9983, rather than 10,000 indicating that it also occurs at a location off a grid intersection. It is noted that the highest or central peak on the normalized surface has a value of 28,760.

The use of the semicircular overlay transform grid produces a relative position/intensity surface with the same amount of useful information as would be produced using a full circular overlay grid. The other half of a full circular overlay grid would produce a surface which is phase symmetrical with the surface produced by the one-half circular grid.

A normalized relative position/intensity surface represents information which can be expressed in quantitative values which represent the spatial plane pattern of the fingerprint to be identified. In order to derive the quantitiative values on a uniform basis, it is necessary to establish a main coordinate reference system for the relative position/intensity surface.

MAIN COORDINATE REFERENCE SYSTEM FOR THE RELATIVE POSITION/INTENSITY SURFACE

Figure 10:
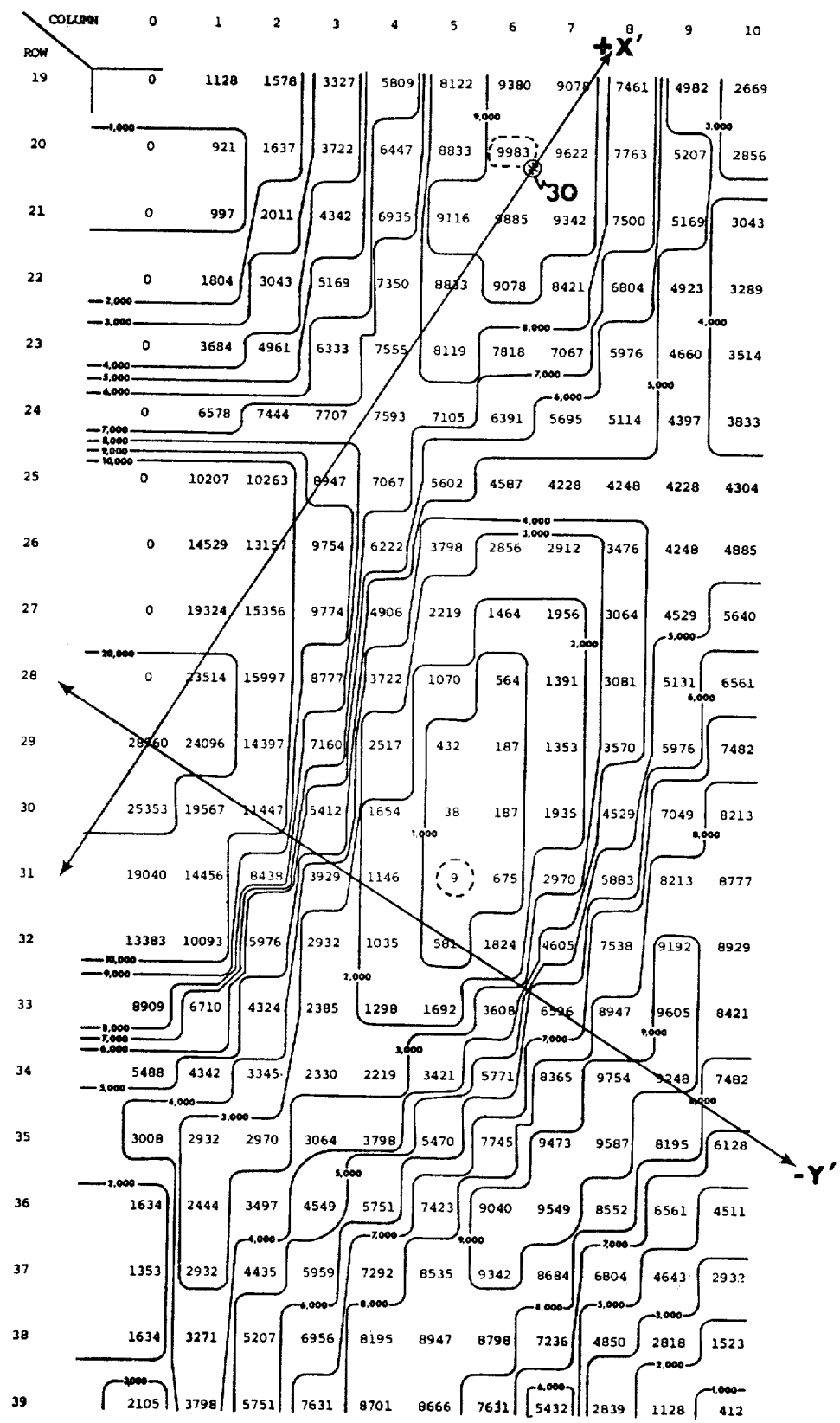
FIG. 10 is a representation of a surface of FIG. 9 after normalization.

In FIG. 10, the contour lines have been applied to illustrate that the relative position/intensity surface includes ridges and valleys. It is noted that the surface defines a ridge which passes through the central peak on the surface (Z-axis coordinate 28,760) and which extends to the right and upwardly. For every fingerprint, the relative position/intensity surface will always include such a ridge but its direction will vary from one fingerprint to another. This ridge will always occur in the relative position/intensity surface as a result of the technique in generating the surface. It therefore serves as a suitable basis for establishing a main coordinate reference system which will provide uniformity among all relative position/intensity surfaces, in identifying different portions of the surfaces.

To establish the orientation of the coordinated reference system with respect to the relative position/intensity surface, a point 30 on the ridge is located which is predetermined distance away from the central peak which always occurs at X-Y coordinates of 0—0. The determination of this point 30 on the ridge is accomplished by a process known as ridge tracing which will now be described.

In ridge tracing, the initial direction of a central ridge from the central peak is determined by examining the data points immediately surrounding the central peak.

Figure 11:
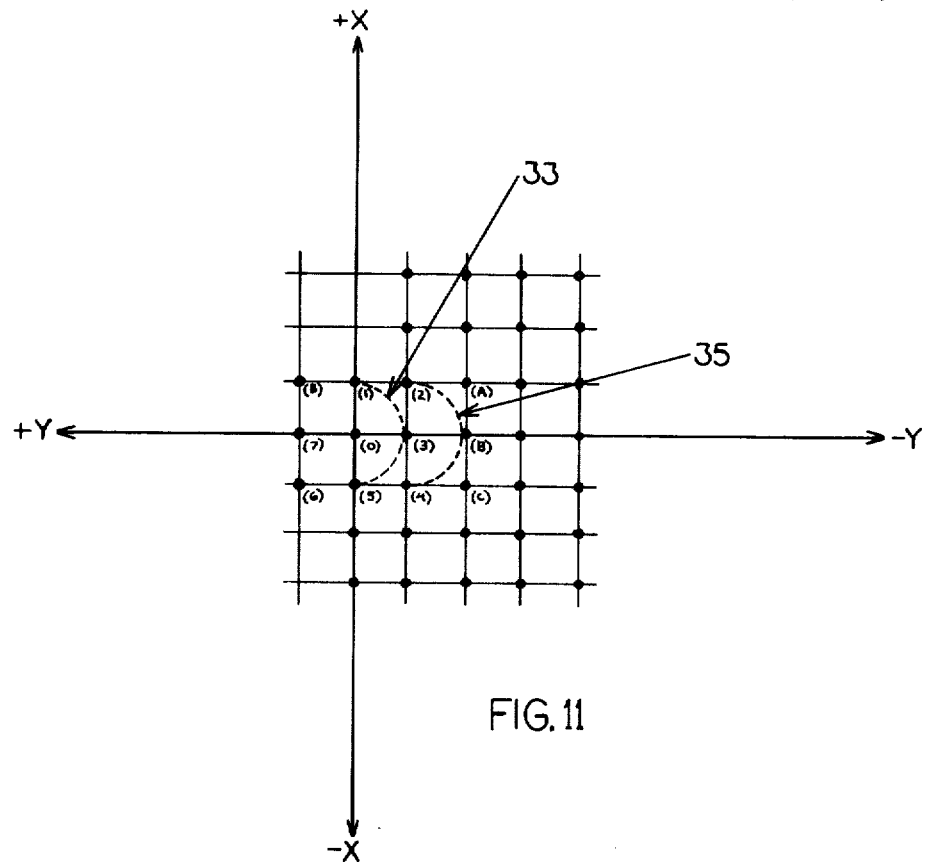
FIG. 11 is a magnified view of a portion of the relative position/intensity surface.

The format of the normalized relative position/intensity surface is shown in FIG. 7 with an X-Y coordinate system thereon. The origin of this system coincides with the central peak on the relative position/intensity surface and each intersection of the coordinate grid represents the position of the Z-axis coordinate values shown in FIG. 10. A magnified view of the relative position/intensity surface immediately surrounding the central peak is shown in FIG. 11. Here the data points of immediate interest are designated by the numbers 1 through 8 and the letters, A, B, C. The data points 1, 6, 7 and 8 are not represented in the usual plot of the normalized relative position/intensity surface (such as FIG. 10) because of the symmetry of the surface, mentioned above. It is noted that the Z coordinate value at point number 6 is the same as point number 2, point number 8 is the same as point number 4, and point number 7 is the same as point number 3, and point number 1 is the same as point number 5.

The initial direction of the central ridge from the origin is determined as follows. A surface is fitted over the origin and the eight surrounding data points (1 through 8) by the surface fitting technique using a bi-quadratic polynomial. The surface is examined along a semi-circular path 33 as shown extending from data point 1 to data point 5 to determine the location of the highest point on the semi-circle. The initial direction of the central ridge is established by a line from the origin through this highest point on the semi-circle.

The first data point along the is now isnow determined. With reference to FIG. 11, assume that the highest point on the semi-circle is on segment II. Data points 1, 2, 3, 4 and 5 will now be considered to the exclusion of data points 6, 7 and 8. (If the initial point should lie on segment I, points 7, 8, 1, 2 and 3 would be considered; if the initial point should lie on segment IV, data points 3, 4, 5, 6 and 7, would be considered; if the initial point should lie on segment III, data points 1, 2, 3, 4 and 5 would be considered.) The relative position/intensity surface bounded by the points under consideration is divided into two quadrants, namely; the quadrant bounded by points 1, 2 and 3 and the quadrant bounded by points 3, 4 and 5. The highest point on the semi-circle lies in the quadrant bounded by points 1, 2 and 3, and the next data point on the ridge is taken as the one of these three which has the highest value. Assuming, for example, that data point 3 is the highest, it is taken as the new origin.

The process just described is repeated with the first selected data point (point 3 in the example) as the new origin. Accordingly a surface is fitted over point 3 and the eight data points surrounding it. The highest point is found on the semi-circle 35 extending from point 2 through point B to point 4. Depending upon the quadrant in which the highest point lies, as described above, the one of the three points in the quadrant having the highest value is selected as the next data point on the ridge. From this point, in the ridge tracing process, after a new point has been selected, the value of the preceding point is considered as 0 in selecting successive new points. This insures that the path of the ridge will never loop back to a point previously selected; further, since selection of new points is limited to one of the five which bound the segment in which the high point on the semi-circle lies, the ridge is defined without "falling off" the ridge or forming a closed loop among a few high points.

The process of selecting succeeding data points along the ridge is repeated and as each new data point is selected it distance from the origin (data point 0) is compared with a predetermined distance. In the illustrative embodiment the predetermined distance is 10 units with a unit being a grid line spacing in the overlay grid. When the distance from the origin is greater than 10 units, the ridge tracing process is terminated. Since the previous point was less than 10 units away, a circle having a radius of 10 units must lie on the relative position/intensity surface between the next to last and the last data points in the ridge tracing process. The data point which is closest to the radius of 10 units, even though it does not lie on the "crest" of the ridge, is next located. This is accomplished by examining the last data point found by ridge tracing and the eight data points surrounding it to determine which of the nine points differs by the least amount from being 10 units away from the origin. The data point thus selected and the eight data points immediately surrounding it are used for surface fitting. A circle having a radius of 10 units about the origin will lie on the fitted surface and the point 30 on that circular segment having the largest Z-axis coordinate value will lie on the crest of the ridge and at the predetermined distance from the origin. The location at the point 30 relative to the origin defines the orientation of the main coordinate reference system to be established. Specifically, as shown in FIG. 10, an orthogonal coordinate system with X' and Y' axes is established with the X'-axis extending through the central peak on the relative position/intensity surface (data point 0) and the highest point 30 on the ridge which passes through the central peak and is a predetermined distance (10 units) from the data point 0 and with the origin at data point 0.

This method of establishing the main coordinate system for the relative position/intensity surface assures that there will be consistency among any number of surfaces in defining portions of the surface for classification purposes. With the established coordinate system for the relative position/intensity surface, a descriptor can be developed for the fingerprint represented.

DEVELOPING A FINGERPRINT DESCRIPTOR

Figure 13:
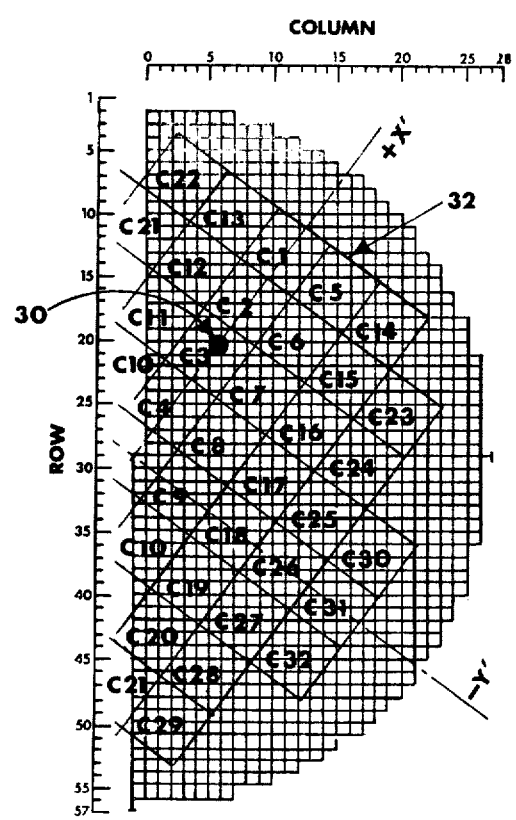
FIG. 13 shows the outline of a relative position/intensity surface with coding grid thereon.
Figure 12:
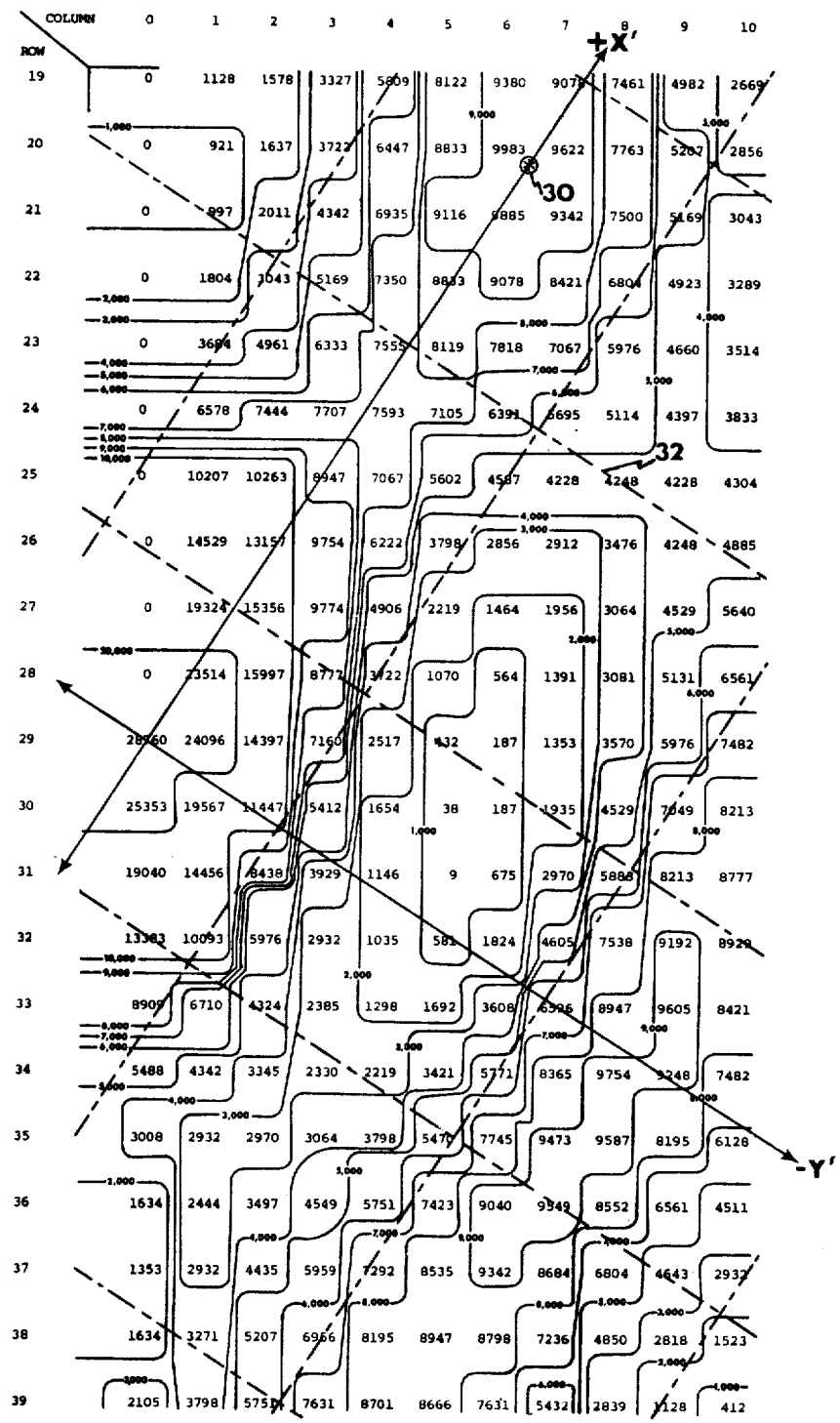
FIG. 12 shows the normalized surface of FIG. 8 with an overlay coding grid.

For the purpose of defining a plurality of different surface areas, a coding grid is superimposed upon the relative position/intensity surface. The coding grid 32 is shown in interrupted lines on the portion of the relative position/intensity surface shown in FIG. 12. The entire coding grid 32 is shown on the full format of the relative position/intensity surface in FIG. 13. The coding grid 32 is aligned with the coordinate system and, in the illustrative embodiment, the grid lines are uniformly spaced a predetermined distance equal to five units, where a unit is the spacing between grid lines on the transform overlay grid. Accordingly, each square in the coding grid normally contains 25 data points. It is noted that all coding squares are effectively fully filled with known data points even though squares at the straight boundary of the relative position/intensity surface are only partially filled with Z-axis coordinate values. The Z-axis coordinates for the remainder of the data points within these squares are known because of the phase symmetry which exists, as previously discussed. The coding squares are numbered in a predetermined order which is arbitrary but the same for all relative position/intensity surfaces. In the illustrative embodiment, as shown in FIG. 13, the coding squares are number "c1" through "c32."

Each coding square is evaluated with respect to a local spatial derivative. Preferably, this is done by computing the average curvature of the relative position/intensity surface within the square, as follows: For each data point within a given square, the Z-coordinate value is subtracted from the average of the Z-coordinate values of the immediately surrounding eight data points, whether or not they are within the given square. The differences are summed for all points within a square and the summation, normalized for the number of points within a square, is taken as the value of curvature of the given square. This process is repeated for each of the coding squares to obtain a first set of curvature values.

To enhance the uniformity and accuracy in determining the curvature values for the coding square, it is desirable to obtain an average value. For this purpose, a second set of curvature values is obtained by rotating the coding grid a predetermined angular displacement in the clockwise direction, the displacement being approximately one degree in the illustrative embodiment. With the coding grid in this position the second set of curvature values is computed in the same manner as for the first. A third set of curvature values is obtained with the coding grid angularly displaced by the predetermined angle in a counterclockwise direction. The average curvature value for each coding square is then determined by taking the average of the values obtained in the first, second and third set of curvature values.

For the purpose of reducing the quantity of data contained in a descriptor, the curvature values for the coding squares is quantized according to a predetermined apportionment. In the illustrative embodiment, four different levels of quantizing are utilized and a specific range of non-quantized curvature values is assigned to each level. Specifically, the curvature values from negative infinity to negative 85 are assigned to the first level, i.e. quantized value 1, curvature values from negative 84 to positive 6 are assigned to level number 2, i.e. quantized value 2, curvature values from positive 7 to positive 110 are assigned to level number 3, i.e. quantized value 3; and curvature values from positive 111 to positive infinity are assigned to the fourth level, i.e. quantized value 4. The quantized values 1, 2, 3 or 4 are the code elements to be used in the descriptor. Since there are 32 coding squares there will be 32 coding elements in the descriptor.

The fingerprint descriptor is constructed by concatenating the quantized values for the coding squares in a predetermined, numbered order of the squares. A typical descriptor is shown in FIG. 14 wherein the first digit corresponds to coding square number 1, the second digit corresponds to coding square number 2, and so forth for the 32 digits of the descriptor.

DETERMINING SEARCH INDICATORS FOR DESCRIPTOR DIGITS

Where fingerprints are coded for the purpose of searching in the fingerprint file for identification, it may be desirable to append a search indicator to each digit of the inquiry descriptor. This technique may improve the reliability of the search by widening the scope of the search to account for borderline similarities resulting from assignment of quantized values. The quantizing of the curvature values, as described above, require a logical decision as to whether the curvature value occurred at one quantizing level or another. The line of demarcation between the quantizing levels is based on statistical thresholding and, for example, a curvature value of 110 has a quantized value of 3 while a curvature of 111 has a quantized value of 4. Where the only difference between an inquiry descriptor and a file descriptor stems from having a given coding square with a curvature value of 110 instead of 111, it is desirable to search both resulting descriptors.

For the purpose of developing search indicators, a very large sample of multiple impressions of one finger is coded and the variations in curvature value for each of the 32 coding squares is recorded. This is repeated for a large number of fingers. Then the curvature variations are examined to determine the standard deviation for each square. With this statistical value, a limit is set on either side of the quantization boundaries equal to 6 times the standard deviation. FIG. 15 is a graphical representation of these limits. Note that the scale of curvature values ranging from negative infinity to positive infinity is divided into four different levels. The shaded region 36 at the quantization boundary between level 1 and level 2 extends on either side of the boundary by a distance equal to 6 times the standard deviation. Similarly, the shaded regions 38 and 40 extend on opposite sides of the respective quantization boundaries by a distance equal to 6 times the standard deviation.

If the curvature for any coding square falls within the unshaded portion of the scale, that value is quantized and only that quantized value need be searched. If the curvature falls within the shaded area at the upper end of the range for the given level, then the quantized value itself should be searched as well as the next higher quantized level. Likewise, if the curvature value falls within the shaded area at the lower end of the range of a level, then the quantized value should be searched as well as the next lower quantized value. In order to provide search indicators in a digital form, the following notation is used; if only the quantized value is to be searched, that value in the descriptor code is followed by a notation "(0)". If the next higher quantized value is to be searched, as well as the quantized value, the quantized value in the descriptor code is followed by the notation "(+)". Similarly, if the next lower quantized value, as well as the quantized value, is to be searched, the quantized value in the descriptor code is followed by the notation "(−)".

An example of a descriptor with appended search indicators is illustrated in FIG. 16. In this example the first four coding squares have a curvature value of −185, +10, +112, and −46. Reference to FIG. 15 indicates that the quantized values are 1, 3, 4 and 2. Further reference to FIG. 15 shows that the curvature value −185 is not within the shaded area at the quantization boundary and therefore the search indicator to be appended is (0). For the second coding square the curvature value is +10 which falls within a shaded area at the quantization boundary at the lower end of the range for level number 3. Accordingly, the search code to be appended is (−). For the third coding square, the curvature value is +112 which falls at the lower end of the range for level number 4 and therefore should have a search indicator of (−). The fourth coding square has a curvature value of −46 which is not within the shaded areas and the search indicator should be (0). Accordingly, the first four digits of the descriptor code with appended search indicators is: 1 (0), 3 (−), 4 (−), and 2 (0). A typical descriptor with search indicators according to this scheme is shown in FIG. 16.

The searching process includes looking in the file for any file print which has a descriptor the same as that given for the inquiry print. If all of the search indicators appended to the descriptor digits are 0 identification is made by a positive match when all digits of the descriptors match (and when there is only one file fingerprint with matching descriptor digits). When the descriptor digits have search indicators of + or −, the file is searched for the descriptor code as given and for the descriptor code as modified by each search indicator taken separately. Identification of a print is then accomplished when all digits in the descriptor code or any of the alternates in the descriptor code match only one file descriptor. The identification process normally uses only one fingerprint descriptor but may use the descriptors for up to ten fingerprints when necessary. It is noted that the search indicators are merely attached to the search inquiry and need not be stored.

DESCRIPTION OF APPARATUS FOR PERFORMING THE METHOD

The method of this invention, as described above, may be performed with the aid of data acquisition and processing apparatus. Such apparatus will be described with reference to FIGS. 17 through 21.

As shown in FIG. 17, the apparatus comprises an optical scanner 50, a preprocessor 52, and a processor 54. The scanner 50 is an optical scanner which views the fingerprint image and produces an analog voltage corresponding to the image density. The output of the scanner is applied to the input of the preprocessor which converts the data representing the fingerprint image to binary form and selects a predetermined portion thereof for subsequent processing. The output of the preprocessor is applied to the processor 54 at the input of a transformation section 56 which produces the relative position/intensity surface transform. This surface is normalized and aligned by the normalization and reference alignment section 58. The normalized and aligned surface transform is processed in a descriptor generation section 60 which produces a fingerprint descriptor which was described above.

The preprocessor 52 is shown in greater detail in FIG. 18. The output signal from the scanner is applied to the input of a quantizer 62. The scanner has a spot size resolution of approximately 50 microns and the analog voltage produced thereby is quantized for each cell location on the fingerprint image into a numerical value ranging from 1 to 32, where the value 1 represents white and the value 32 represents black. The output of the quantizer 62 is applied to a threshold stage 64 which preferably has a variable threshold value which is determined in accordance with the variation in the absolute range of image density levels in the fingerprint impression. In the threshold stage 64 the quantized value for each cell is compared with the treshold value. If the quantized value for a given cell is greater than the threshold value the cell is classified as black and if the quantized value is less than the threshold value the cell is classified as white. A black cell is represented by a binary 1 and a white cell is represented by a 0. The threshold stage 64 thus produces a binary representation of the fingerprint impression and this data represents a two-dimensional array corresponding to the fingerprint image as a black and white pattern. This data is applied to the center locator stage 66. This stage computes the average location of the fingerprint center based upon the curvature of the fingerprint ridges in the upper part of the fingerprint impression. The fingerprint center is defined in terms of reference coordinates and this data is applied to the mask stage 68. The mask stage also receives the output data from the threshold stage 64 which represents the two-dimensional array of the binary fingerprint image. The mask stage eliminates all data from the array corresponding to the fingerprint impression beyond a fixed radius from the fingerprint center. The output data from the mask stage 68 represents a two-dimensional array with a circular boundary and corresponding with that portion of the original fingerprint image within a circular mask aperture, suitably with a diameter of 1.2 centimeters. This output data from the mask stage 58 is applied to the input of the processor 54.

The processor 54 is shown in block diagram in FIG. 17 and is shown in greater detail in the functional block diagram of FIGS. 19, 20 and 21. The processor 54 may take the form of a general purpose computer with programming according to conventional techniques to implement the method of this invention. It is preferred, however, to employ a special purpose computer which, as herein represented, is implemented entirely in hardware, suitably with a central processing unit, a random access memory for data storage and a read-only memory for program storage.

In the transformation section, as depicted in FIG. 19, the binary fingerprint data within the mask aperture is stored as a fingerprint data array 72. A transform array, which corresponds to and represents the transform grid of FIG. 5, is also stored in the process for performing the transformation on the input fingerprint data array. A transform array manipulator 74 accesses the fingerprint data array and zeros and aligns the transform array with respect to the fingerprint array. In the initialized condition, the origin of the transform array coincides with a selected binary element in the fingerprint array. The array manipulator 74 then steps the transform array with respect to the finger array so that the origin coincides successively with all binary elements in the fingerprint array. As this array manipulation proceeds, a logical test 76 is performed at each element of the fingerprint array to determine whether it is a binary 1 or a binary 0. When it is a binary 1 a test is made for coincidence between the transform array elements and the fingerprint array elements. This test determines whether the fingerprint array element coinciding with the transform array element is a binary 1 or a binary 0. A counter/index 78 adds a +1 to each element of the transform array when a binary 1 in the fingerprint array coincides with that element of the transform array. This produces an RPI (relative position/intensity) array 80, an orthogonal array with a semi-circular boundary and a number of elements equal to the number of elements in the transform array. Each element in the RPI array has a value corresponding to the count accumulated by the counter/index 78 for that element. The RPI array corresponds to and represents the relative position/intensity surface previously discussed. The RPI array is stored and accessed by the normalization and reference alignment section 58.

The nromalization and reference alignment section 58 is shown in FIG. 20. In the RPI array 80, each element has a value corresponding to the Z-axis coordinate discussed above and the values for the different elements will vary over a wide range. It is the relative values of the array elements that are of interest, rather than the absolute values, and therefore the values are normalized, as previously discussed. A maxima/minima stage 82 finds the highest peak (excluding the origin or central peak of the RPI array) and the lowest point in the RPI array. This operation is performed using a surface fitting stage 84 in which a bi-quadratic is used to fit a two-dimensional surface to any point and the eight surrounding points. With the finding of the lowest and the second highest points in the RPI array, a normalizer 86 normalizes the values to a fixed range corresponding to the difference between the values of such points. In order to establish a main coordinate reference system for the RPI array a ridge tracing stage 88 performs a ridge tracing procedure to find a point on the surface represented by the RPI array which is a predetermined distance from the origin of the array and lying on the crest of the ridge passing through the origin. The location of this point together with the location of the origin of the RPI array is used in a coordinate reference stage 90 to define the principal axis of an orthogonal coordinate system. The coordinate reference stage also divides the RPI array into 32 coding squares corresponding to the coding grid as previously discussed. The coordinate reference stage 90, taken with the RPI array 80 represents a normalized and aligned RPI array prepared for procesing by the descriptor generation section 60.

The descriptor generation section 60 is shown in FIG. 21. The normalized RPI array 92 is evaluated for curvature of the surface represented thereby. The curvature stage 94 computes the average surface curvature represented by the array for each of the 32 coding squares and stores a curvature value for each square. To obtain improved accuracy and uniformity, an average value for each square is obtained by use of a dither section 96. The dither section rotates the coordinate system of the RPI array together with the coding squares through approximately 1° degree clockwise and the curvature section computes a second value of curvature for each square. Then the dither section 96 rotates the coordinate system 1° counterclockwise and the curvature section computes a third value of curvature for each square. The curvature section computes the average of the three curvature values for each square and the average value for each square is stored. The curvature values are quantized by a quantizer 98 into one of four levels and the quantized values are stored for all 32 coding squares. The quantizer also adds a search indicator to each quantized value if the fingerprint is an inquiry copy. The quantized values are concatenated into a 32 character word by a descriptor stage 100 to produce the desired descriptor for the fingerprint impression being processed.

Although the description of this invention has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. The method of classifying fingerprints comprising the steps of: making an impression of a fingerprint on a two-dimensional surface, transforming the two-dimensional surface representation of the fingerprint impression into a representation of a three-dimensional surface with a predetermined set of first and second coordinates and with a variable third coordinate for each set of first and second coordinates, the third coordinate having a value dependent upon the frequency of occurrence or ridge lines at a specific set of first and second coordinates when the origin of the first and second coordinates is taken at multiple positions over a prescribed part of the fingerprint impression, determining the values of local spatial derivatives of a plurality of different areas of the three-dimensional surface, and concatenating said values in a predetermined order to construct a descriptor code for the fingerprint.

2. The invention as defined in claim 1 wherein the step of making an impression includes making an impression comprising a pattern of analog values which define ridges and valleys, and converting the pattern of analog values to a pattern of binary values which also define ridges and valleys.

3. The invention as defined in claim 2 including the step of establishing a main coordinate reference system which is oriented with one axis extending along a line inherently definable for any fingerprint and locating said plurality of different areas relative to the coordinate reference system.

4. The invention as defined in claim 1 wherein said determining step is performed by determining the value of curvature for each of said plurality of different areas.

5. The invention as defined in claim 2 including the step of selecting, in accordance with a criteria which is repeatable for other fingerprint impressions, a part of the area of the pattern of binary values and performing said transforming step only on said selected part of the pattern.

6. The invention as defined in claim 5 wherein the step of selecting a part of the area is performed by taking the area within a predetermined radius of the average position of the center of curvature of the upper ridges of the pattern of binary values.

7. The invention as defined in claim 2 wherein said step of transforming is performed by counting the number of binary digits of the same binary value which have the same coordinates relative to a plurality of different coordinate reference axes each of which has it origin at a different position and at the position of a binary digit of said same binary value.

8. The invention as defined in claim 7 wherein the range of said coordinates is limited to a distance of approximately 2½ ridges about the origin.

9. The invention as defined in claim 8 wherein the range of coordinates is limited to a semi-circle.

10. The invention as defined in claim 8 including the step of normalizing the representation of said three-dimensional surface by setting the lowest point and a peak other than the highest peak at preselected values and scaling the remaining points proportionally.

11. The invention as defined in claim 10 wherein the lowest point and the second highest peak are identified by a surface fitting technique.

12. The invention as defined in claim 3 wherein said main coordinate reference system is established by ridge tracing from the position on said surface with the highest number of counts.

13. The invention as defined in claim 1 wherein said plurality of different areas of the three-dimensional surface comprise a predetermined number of equal projected areas each being rectangular and aligned in the same orientation as the others with the main coordinate reference axes.

14. The invention as defined in claim 4 wherein the step of determining the curvature is repeated for alternate rotative positions of the grid of squares, and computing the average values of curvature from the alternate positions.

15. The invention as defined in claim 1 including the step of quantizing the values of local spatial derivatives and wherein the step of concatenating is performed upon said quantized values to construct said descriptor code.

16. The invention as defined in claim 14 wherein said average values of curvature are quantized and the step of concatenating is performed by concatenating said quantized values.

17. The invention as defined in claim 16 wherein said concatenating step includes arranging said quantized values into a multiple digit number with each digit position corresponding to aa predetermined one of said different areas of the three-dimensional surface.

* * * * *